June 9, 1959    J. T. CLARK, JR    2,890,357
ELECTRIC MOTOR CONSTRUCTION
Filed May 17, 1955    2 Sheets-Sheet 1

INVENTOR.
JOSEPH T. CLARK, JR.
BY
ATTORNEYS

June 9, 1959  J. T. CLARK, JR  2,890,357
ELECTRIC MOTOR CONSTRUCTION
Filed May 17, 1955  2 Sheets-Sheet 2

INVENTOR.
JOSEPH T. CLARK, JR.
BY Hudson, Boughton,
Williams, David & Hoffmann
ATTORNEYS

United States Patent Office 2,890,357
Patented June 9, 1959

2,890,357

ELECTRIC MOTOR CONSTRUCTION

Joseph T. Clark, Jr., Parma, Ohio, assignor to The Leece-Neville Company, Cleveland, Ohio, a corporation of Ohio Application May 17, 1955, Serial No. 508,879

6 Claims. (Cl. 310—258)

This invention relates to electric motors and as one of its objects aims to provide a novel motor construction and method for the more rapid and economical production of electric motors, particularly small-size motors of fractional horsepower rating.

Electric motors produced according to this invention are usable in various fields and for various purposes as either intermittently-operating or continuously-operating motors, and are especially suitable for auxiliary power purposes in motor vehicles, as for actuating window lifters, adjustable seats, blowers, trunk lids, and the like.

Another object of this invention is to provide a novel electric motor of a compact and inexpensive construction having a frame made, at least in part, of rolled metal plate or sheet metal as distinguished from cast metal and hereinafter referred to merely as metal plate, and in which the field poles comprise formed portions of such metal plate.

A further object is to provide a novel electric motor whose frame is a polygonal-shaped ring or cage made of connected sections of metal plate and in which sides of the frame have field poles thereon formed by inwardly offset integral portions of such metal plate.

Still another object is to provide a novel electric motor of this character whose frame is a polygonal-shaped ring or cage refining a magnetic circuit lying in a plane parallel to the rotation axis of the armature and having a low value of flux leakage from the field poles.

Yet another object is to provide such a novel form of electric motor in which strips of metal plate comprise the pole-carrying sides of the frame, and in which the poles are formed by integrally connected portions of the strips comprising inwardly extending webs and transversely arched pole face portions connecting such webs.

It is, likewise, an object of this invention to provide a novel electric motor having a substantially flat-sided quadrangular ring-shaped frame formed by connected side and end walls made of metal plate with an armature rotatably mounted in the end walls, and in which field poles carrying field coils comprise formed integral portions of the side walls, the field coils preferably being wound in place on the poles.

Additionally, this invention provides such a novel electric motor of a compact and inexpensive construction in which the relatively open character of the axially disposed ring-shaped or cage-like frame leaves the field coils and armature relatively exposed for efficient cooling even though the motor is installed in a relatively enclosed location, and in which mounting studs or the like, welded to the metal plate constituting the ring-shaped frame, facilitate the mounting of the motor in any desired relative operating position.

Other objects and advantages of the invention will be apparent in the following detailed specification and in the accompanying sheets of drawings forming a part thereof and in which.

Figures 1, 9:
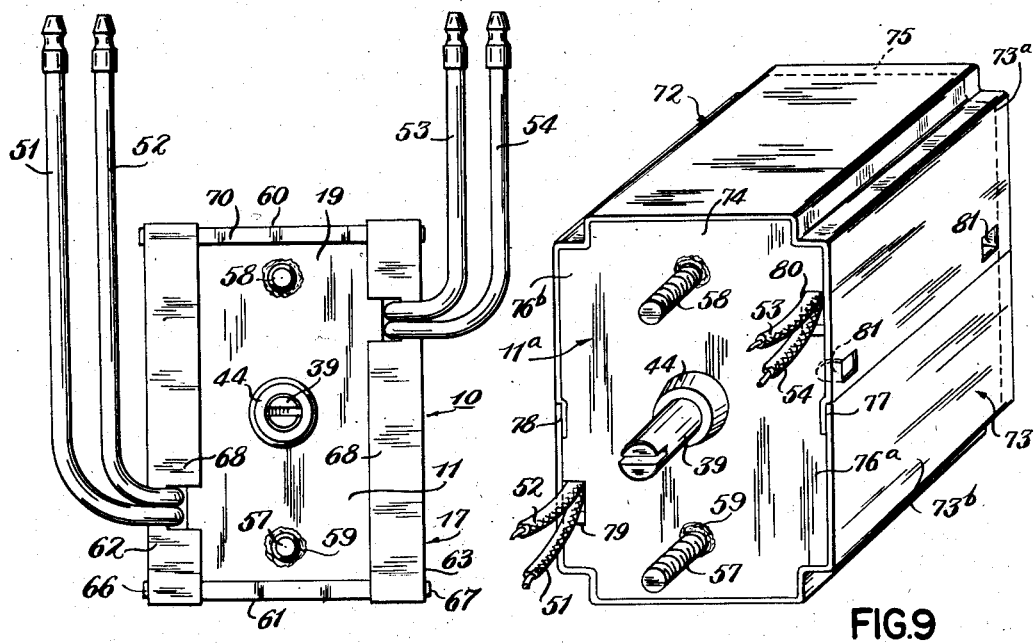
Fig. 1 is an outside end elevation of an electric motor constructed in accordance with the present invention.
Fig. 9 is a perspective view showing a modified form of the motor.
Figure 7:
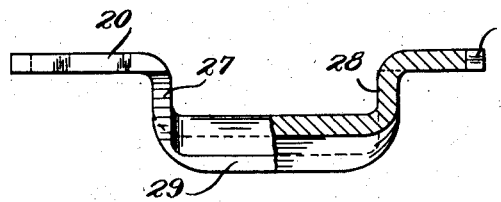
Fig. 7 is an elevational view showing the pole piece of Fig. 6 partly in section as indicated by the section line 7—7.
Figure 5:
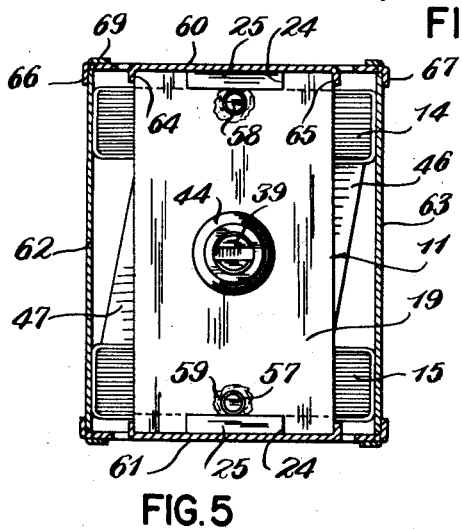
Fig. 5 is an end view similar to that of Fig. 1, but with the outer housing shown in transverse section.
Figure 4:
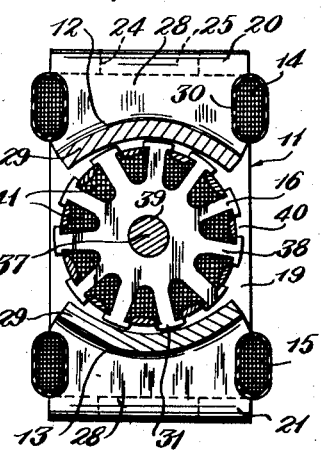
Fig. 4 is a transverse section taken through the motor as indicated by section line 4—4 of Fig. 3.

As representing one practical embodiment of this invention, the drawings show an electric motor 10 of the above-mentioned compact and inexpensive construction and which comprises, in general, a frame 11 having main field poles 12 and 13 thereon carrying field windings 14 and 15, and an armature 16 rotatable in the frame between the field poles. The motor 10 is shown in Figs. 1 and 5 as having an outer housing 17 extending therearound, and in Figs. 2 and 3 the same motor is shown but with the outer housing removed therefrom.

One of the unique characteristics of the motor 10 is that the frame 11 is a polygonal-shaped ring or cage defining a magnetic circuit whose longitudinal midplane includes the rotational axis of the armature 16. The frame 11 comprises connected end and side walls 18, 19, 20, 21 formed by pairs of opposed walls of the polygon. In this instance, the frame 11 is shown as being of a flat-sided quadrangular shape with the opposed walls 18 and 19 forming the end members of the frame, and the opposed walls 20 and 21 forming the pole pieces or pole-carrying members of the frame.

Another unique characteristic of the motor 10 is that the frame 11 is made of metal plate which may comprise any suitable low-carbon ferromagnetic plate, such as sheet steel or hot-rolled steel plate. The frame members defined by the walls 18, 19, 20 and 21 comprise sections or strips of such metal plate, preferably sections of a substantially uniform width and which can be stamped, or otherwise cut, from such stock material with relatively simple and inexpensive equipment and with minimum waste of such stock material.

The two end members 18 and 19 are flat plates and are identical in shape, such that they can be formed by the same die equipment. The frame members 20 and 21 are, likewise, identical in shape so that they can be produced by the same die means, but are of a special shape in that they have the field poles 12 and 13 integrally formed thereon.

The frame members 20 and 21 extend between and connect the frame members 18 and 19 so as to form the relatively rigid flat-sided ring-shaped open frame 11 with the poles 12 and 13 extending into the frame opening or enclosures 23 and into cooperating relation with the armature 16. At the four corners of the quadrangular frame 11, the adjacent ends of the frame members 18, 19, 20 and 21 are suitably connected in a metal-to-metal relation so as to define a relatively low-reluctance magnetic circuit. The adjacent ends of these frame members are connected by welding, or the like, and can also be connected by providing the frame members 20 and 21 with end notches 24 therein and providing the frame members 18 and 19 with end lugs 25 which engage in such notches.

Figure 8:
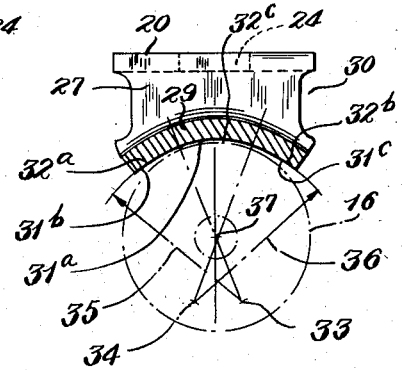
Fig. 8 is a transverse section of a somewhat diagrammatic form taken through the pole piece of Fig. 6 as represented by the section line 8—8 thereof.
Figure 6:
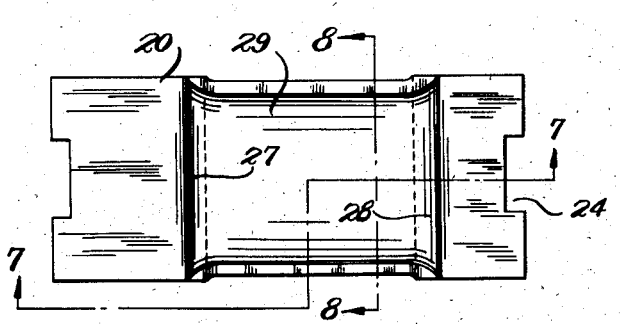
Fig. 6 is a plan view of one of the pole pieces of the frame in detached relation.

A further unique characteristic of the motor 10 is that the poles 12 and 13 comprise inwardly offset formed integral portions of the frame members 20 and 21. These inwardly offset portions comprise a pair of inwardly extending axially spaced webs 27 and 28 in each of the frame members 20 and 21, and an axially extending transversely arched pole face portion 29 connecting such web portions. The web portions 27 and 28 and the pole face portions 29 are integrally connected full-width portions of the frame members 20 and 21 which have been deflected to the desired inwardly offset relation preferably by suitable die stamping operations performed on these frame members. As shown in Fig. 8, the edges of the webs 27 and 28 are preferably provided with notches or recesses 30 for receiving portions of the field coils 14 and 15 for retaining these coils in their assembled position on the poles 12 and 13.

The pole face portions 29 are presented to the armature 16 so as to define an arcuate air gap 31 of an appropriately small radial width between each pole face and the periphery of the armature. The transverse curvature of the pole face portions 29 is preferably such that the air gap 31 will comprise a central concentric portion $31^a$ of a minimum substantially uniform radial width, and outwardly-divergent tapered end portions $31^b$ and $31^c$ of relatively increased radial width. The transverse curvature of the pole faces providing the air gap portions $31^a$ and $31^b$ of such varying width, can be a curvature represented by arcs $32^a$ and $32^b$ struck from the centers 33 and 34 of Fig. 8 and having radii represented by the lines 35 and 36. The arcs $32^a$ and $32^b$ have their adjacent ends tangent to a central concentric connecting arc $32^c$ whose radius of curvature has the rotation axis 37 of the armature as its center.

The armature 16 can be of a conventional construction comprising a laminated cylindrical armature body 38 fixed on a shaft 39 and having axial slots 40 therein, and suitable armature windings 41 carried by the body 38 and electrically connected with the segments of a commutator 42. The armature 16 is mounted for rotation in the frame 11 by having its shaft 39 journalled in suitable bearings 43 and 44 of the end frame members 18 and 19.

The motor 10 also includes suitable brushes 45 mounted in brush holders 46 and 47 and engaging the commutator 42. The brush holders 46 and 47 are carried by a flat brush support ring 49 of insulating material which is suitably mounted on the inner face of the frame member 18.

From the construction of the motor 10 as thus far described, it will be seen that this motor comprises a relatively small number of parts which can be economically produced and rapidly assembled. In the assembly of the component parts of the motor 10, the frame members 18 and 19 are suitably supported in an axially spaced relation with the armature shaft 39 mounted in the bearings 43 and 44. The frame members 20 and 21 with the field coils 14 and 15 in place thereon, are then applied to the frame members 18 and 19 and secured thereto.

The field coils 14 and 15 can be individually preformed and assembled on the frame members 20 and 21, but preferably, are wound in place on the poles 12 and 13. The field coils 14 and 15, whether preformed or wound in place, are put on the poles 12 and 13 before the frame members 20 and 21 are connected to the frame members 18 and 19.

From the shape and construction of the frame 11 as above described, it will be readily seen that the frame defines a magnetic path whose midplane contains the rotation axis of the armature 16 and that the magnetic flux produced by the field coils 14 and 15 will traverse this magnetic path with minimum leakage of flux from the field poles 12 and 13. It will also be seen that since the frame members 20 and 21 are made as sheet metal stampings with the main field poles 12 and 13 integrally formed thereon, these frame members can be produced very rapidly and economically and that the costly dies and expensive assembly operations heretofore required in the manufacture of motors having laminated frame structures can be avoided. The winding of the field coils 14 and 15 directly on the poles 12 and 13 also minimizes the production and assembly costs for these field coils.

As shown in this instance, the motor 10 is a reversible motor although, if desired, the motor can be built as a unidirectional motor. The motor is here provided with pairs of suitable leads 51, 52 and 53, 54 for connecting the motor in the energizing circuits in which it is to be used.

Figure 2:
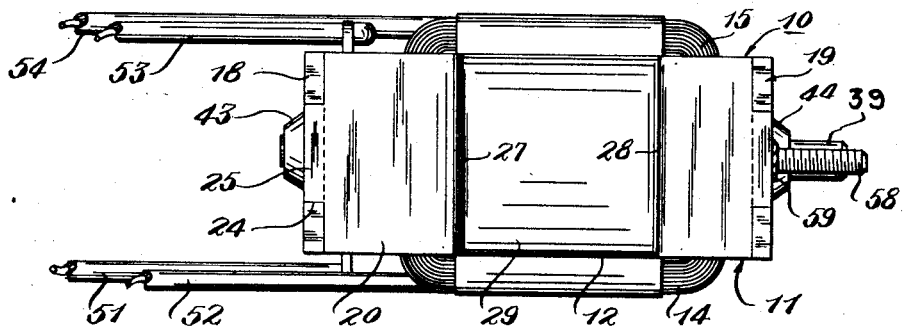
Fig. 2 is a top plan view and Fig. 3 is a side elevation, both views showing the motor with the outer housing removed therefrom.
Figure 3:
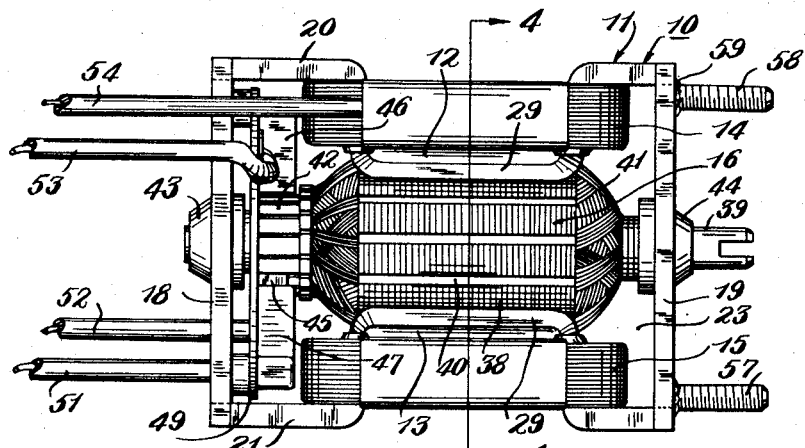

When the motor 10 is used in the uncovered condition shown in Figs. 2 and 3, that is with the outer housing 17 removed, the armature 16 and the field coils 14 and 15 are in a relatively exposed condition for the free dissipation of heat therefrom. The relatively open sides of the frame 11 leave substantial portions of the periphery of the armature 16 exposed between the poles 12 and 13, such that the longitudinal edges of slots 40 will act as air impelling elements for creating armature windage during the rotation of the armature.

This windage will cause a substantial flow of air to take place into and out of the frame opening 23 in cooling relation to the armature and the field coils. This flow of cooling air results mainly from the action of centrifugal force in throwing air radially out of the slots 40 at and adjacent the intermediate portion of the armature. The air which is thus thrown radially out of the slots 40 is replaced by air flowing into and along the slots from the ends of the armature, such that an effective continuous flow or circulation of cooling air is created during the rotation of the armature.

The flat-sided character of the frame 11 permits the motor 10 to be readily mounted with the rotation axis of the armature 16 either in a vertical position or in a horizontal position by standing the motor on one or another of the flat sides. Mounting of the motor in the desired operating position is facilitated further by mounting studs, or the like, 57 and 58 projecting from one of the flat sides of the quadrangular frame 11. In this instance, the studs 57 and 58 are shown as projecting from the end frame member 19 on opposite sides of the projecting portion of the armature shaft 39. Since the frame 11 is made of steel plate, the studs 57 and 58 can be readily mounted thereon by welded connections 59. A suitable clearance opening will, of course, be provided in the mount for receiving the projecting portion of the bearing 44.

The outer housing 17 is here shown as comprising two pairs of cover plates 60, 61 and 62, 63. The cover plates 60, 61 overlie the frame members 20 and 21, and the cover plates 62, 63 extend across the open sides of the frame 11. The pairs of cover plates 60, 61 and 62, 63, together with the frame members 18 and 19, form a full enclosure for the motor.

The cover plates constituting the outer housing 17 are preferably made of relatively thin sheet metal although, if desired, they could be made of a suitable non-metallic sheet material such as plastic or fibrous sheet material. The top and bottom cover plates 60 and 61 have pairs of inwardly extending locating lugs 64 and 65 thereon which engage the ring-shaped frame 11 along the side edges thereof, and also have pairs of bendable tabs 66 and 67 thereon which extend through openings of the side cover plates 62 and 63 and have a locked engagement with the latter.

The side cover plates 62 and 63 also have end flanges 68 thereon which overlie edge portions of the frame members 18 and 19, and relatively narrower flanges 69 which overlie edge portions of the plates 60 and 61.

Similarly, the cover plates 60 and 61 have relatively narrow flanges 70 thereon which overlap edge portions of the frame members 18 and 19 between the wide end flanges of the cover plates 62 and 63.

Fig. 9 of the drawings shows a motor 72 embodying a modified construction contemplated by this invention. In the motor 72 the outer housing 73 is relatively simpler than the outer housing 17, in that it consists of a unitary structure formed by only two connected cover sections 73ª and 73ᵇ. The use of this simpler form of outer housing is made possible by providing the end frame members 74 and 75 with edge extensions 76ª and 76ᵇ which project laterally from the frame 11ª for a distance slightly greater than the distance which the field coils project from the frame opening.

The unitary outer housing 73 is in the form of an open-ended sleeve and is assembled on the frame 11ª by an endwise or axial movement thereover to the relative position shown in Fig. 9. The housing 73 is formed by the two trough-shaped cover sections 73ª and 73ᵇ which have their adjacent longitudinal edges or side flanges overlapped and spot welded together at the joints 77 and 78. The end frame members 74 and 75 are identical with the exception that one of these members, in this case the member 74, has the mounting studs 57 and 58 thereon and also has edge notches 79 and 80 therein to accommodate the circuit leads 51, 52 and 53, 54.

The outer housing 73 is retained in its assembled position on the motor 72 as by bendable lugs 81 struck inwardly from the housing and projecting into the frame opening just inwardly of the end members 74 and 75. In all other respects the motor 72 is identical with the motor 10 described above.

From the accompanying drawings and the foregoing detailed description, it will now be readily understood that this invention provides a novel form construction and method for utilization in the production of low-cost electric motors and particularly in small-size electric motors of fractional horsepower rating. Since many of the advantages of the novel construction and method have already been explained above, they need not be here repeated.

Although the motor construction and method of this invention have been illustrated and described herein to a somewhat detailed extent, it will be understood, of course, that the invention is not to be regarded as being limited correspondingly in scope but includes all changes and modifications coming within the terms of the claims hereof.

Having thus described my invention, I claim:

1. In an electric motor, a rectangular field ring of ferromagnetic material comprising pairs of exteriorly-flat side and end walls forming the sides and ends of the rectangle, said side and end walls having the ends thereof in meeting engagement and secured together, said side and end walls being of rolled-metal-plate stock, field pole members on said side walls and extending inwardly of said ring at points intermediate the ends of said side walls, an armature supported by said end walls for rotation between said pole members, and field coils lying within said ring and mounted on said pole members in surrounding relation to the latter, said pole members comprising inwardly extending axially spaced webs and axially extending transversely arched pole face portions connecting said webs, the webs and pole face portion of each of said pole members being integrally connected die-formed portions of one of said side walls.

2. An electric motor as defined in claim 1 in which said armature has a drive shaft portion projecting from one of said end walls, and in which said one end wall has projecting studs thereon adapting the motor for attachment to a support.

3. An electric motor as defined in claim 1 in which the edges of said webs have notches therein and in which said field coils engage in said notches.

4. An electric motor as defined in claim 1 in which said side and end walls are of a substantially uniform width longitudinally thereof, and in which said side walls comprise strips of said roller-metal-plate stock of substantially the same width as said end walls.

5. In an electric motor, a rectangular field ring of ferromagnetic material comprising pairs of exteriorly-flat side and end walls forming the sides and ends of the rectangle, said side and end walls having the ends thereof in meeting engagement and secured together, said side and end walls being of rolled-metal-plate stock, field pole members on said side walls and extending inwardly of said ring at points intermediate the ends of said side walls, an armature supported by said end walls for rotation between said pole members, field coils lying within said ring and mounted on said pole members in surrounding relation to the latter, said pole members comprising inwardly extending axially spaced webs and axially extending transversely arched pole face portions connecting said webs, the webs and pole face portion of each of said pole members being integrally connected die-formed portions of one of said side walls, said ring being open on two sides thereof, and an outer sheet metal housing secured to said ring exteriorly thereof and having side portions forming covers for the open sides of said ring.

6. An electric motor as defined in claim 5 in which the intermediate portions of said end walls are of a width transversely of the armature at least as great as the transverse width of said coils, and in which said outer housing comprises a sheet metal sleeve open at the ends thereof and disposed in axially telescoped relation around said ring, the end walls of said ring forming end closure walls for said sleeve.

References Cited in the file of this patent

UNITED STATES PATENTS

| | | |
|---|---|---|
| 292,079 | Wenstrom | Jan. 15, 1884 |
| 893,228 | Dunn | July 14, 1908 |
| 1,162,991 | Entz | Dec. 7, 1915 |
| 1,224,602 | Churchward | May 1, 1917 |
| 1,327,619 | Koppitz | Jan. 13, 1920 |
| 1,511,348 | Kaisling | Oct. 14, 1924 |
| 1,926,411 | Gilbert | Sept. 12, 1933 |
| 2,465,224 | Hansen et al. | May 22, 1949 |

FOREIGN PATENTS

| | | |
|---|---|---|
| 3,928 | Great Britain | of 1880 |